(No Model.) 2 Sheets—Sheet 1.
E. C. HARGRAVE.
WATER DISTILLING APPARATUS.

No. 552,835. Patented Jan. 7, 1896.

Attest:
T. Flues
Jas. M. Maxon.

Inventor:
Edward C. Hargrave,
By Jas. E. Thomas
Atty.

(No Model.) 2 Sheets—Sheet 2.

E. C. HARGRAVE.
WATER DISTILLING APPARATUS.

No. 552,835. Patented Jan. 7, 1896.

Attest:
J. Flues
Jas. M. Maxon.

Inventor:
Edward C. Hargrave,
By Jas E. Thomas,
Atty.

UNITED STATES PATENT OFFICE.

EDWARD C. HARGRAVE, OF BAY CITY, MICHIGAN, ASSIGNOR, BY DIRECT AND MESNE ASSIGNMENTS, TO ELISHA P. GROW AND JAMES E. THOMAS, OF SAME PLACE.

WATER-DISTILLING APPARATUS.

SPECIFICATION forming part of Letters Patent No. 552,835, dated January 7, 1896.

Application filed February 19, 1891. Renewed June 10, 1895. Serial No. 552,347. (No model.) Patented in Canada September 13, 1894, No. 47,039.

*To all whom it may concern:*

Be it known that I, EDWARD C. HARGRAVE, a citizen of the United States, residing at Bay City, in the county of Bay and State of Michigan, have invented certain new and useful Improvements in Water-Distilling Apparatus, (for which I have obtained a Canadian patent, No. 47,039, dated September 13, 1894;) and I do declare the following to be a full, clear, and exact description of the invention, such as will enable others skilled in the art to which it appertains to make and use the same, reference being had to the accompanying drawings, and to the letters of reference marked thereon, which form a part of this specification.

The object of my invention is to provide a means whereby water for domestic and other uses can be cheaply and efficiently purified from all vegetable and mineral matter in suspension or solution, and also from all volatile ingredients, disease germs, bacteria, &c.

Another object of my invention is to provide water for domestic and similar uses that is pure and free from all matter deleterious to health; and the invention consists in the combination, arrangement, and construction of the several devices and parts of the apparatus, as will be hereinafter definitely explained, and also specifically pointed out in the claims of this specification.

My invention is illustrated in the accompanying drawings, in which—

Figure 1:
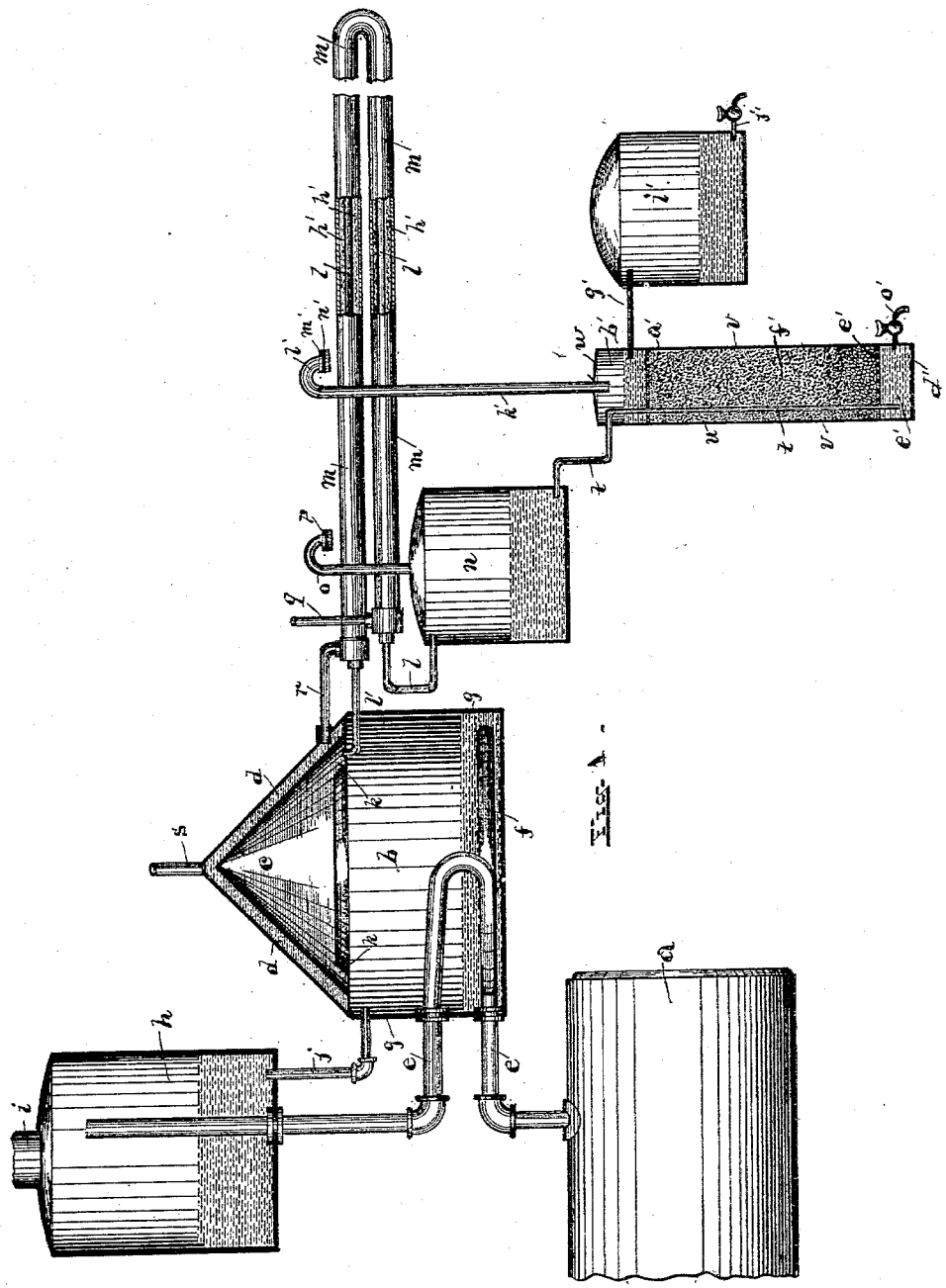
Figure 2:
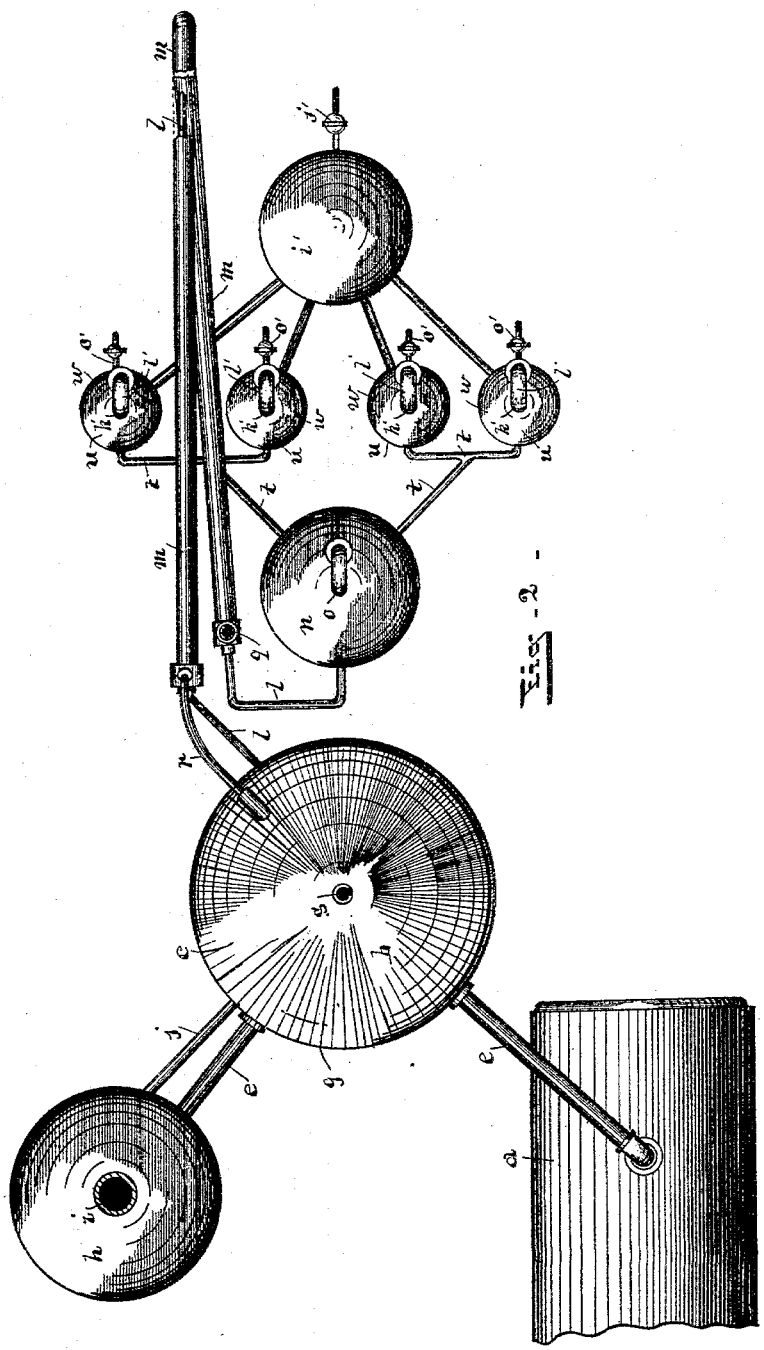

Figure 1 is a side elevation, partly in vertical section, of my improved water distilling and aerating apparatus. Fig. 2 is a plan view of the same.

$a$ represents a steam-boiler of any desired form.

$b$ is an evaporating-chamber provided on its upper side with a roof $c$ of conical form, and above the roof $c$ is arranged an annular water-space $d$.

$e$ is a steam-pipe leading from the boiler $a$ into the lower portion of the chamber $b$, where being provided with coils $f$ within the chamber it is again led through the casing $g$, which incloses the chamber, and thence to a condensing-chamber $h$, which is provided with a suitable opening $i$ for communication with the surrounding atmosphere.

$j$ is a pipe with one end connected with the chamber $h$, while the opposite end enters the chamber $b$, and $j'$ is a valve for said pipe.

The upper portion of the inner walls of the chamber $b$ is provided with an annular shelf or drip-trough $k$, and through the wall of the chamber is passed one end of a pipe $l$, and is also connected with the drip-trough $k$, so as to receive the contents thereof, and the portion of this pipe outside of the chamber first being surrounded by a large pipe $m$, so as to leave an annular space $h'$ between the inner and outer pipe, is extended to a considerable length horizontally by coils or bends, and is then connected by its opposite end to the upper portion of a storage-tank $n$, which is of a suitable size and is provided with an upwardly-extending air-pipe $o$, which, reaching above the pipe $m$, has its upper end reversed or turned downwardly, and is provided with a covering $p$, consisting of fibrous material, as cloth, lint, or wool secured in position over the end opening.

$q$ is a water-pipe leading from a pump or other suitable source for supplying cold water, and is connected to the end of the pipe $m$ in proximity to the storage-tank, while from the opposite end of the pipe $m$ a pipe $r$ is led to the lower portion of the annular water space or chamber $d$, to the apex or upper portion of which a waste-pipe $s$ is connected, and which may be led to the pumps feeding the boiler or to any other desired point.

In carrying out my process with this apparatus, cold water is forced from a pump or other means through the pipe $q$ into the pipe $m$, thence through the pipe $r$ and chamber $d$ out through the waste-pipe $s$, which operates to cool the pipe $l$ and the roof $c$ of the chamber $b$. Water in the boiler $a$ is converted into steam, which passes from the boiler under pressure through the pipe $e$ and coils $f$ to the chamber $h$, leaving behind in the boiler $a$ all vegetable and mineral impurities, and the steam in contact with cool surfaces is partially condensed, and on reaching the chamber $h$ the uncondensed portion of the steam passes out through the opening $i$, carrying along a large portion of the volatile gases and impurities, while the water formed by the condensation drops to the bottom of the chamber freed from all mineral and vegetable ingredients, and also freed from the most volatile and gaseous of its former composition. This water then passes by means of the pipe $j$ to the evaporating-chamber $b$, which is closed against the entrance or exit of air, where, by means of the heat radiating from the coils $f$, it is again converted into steam, which rising and coming in contact with the cold surface of the roof $c$ is again condensed, and the water thus formed follows the slope of the roof and is caught by the drip-trough $k$ and conducted by the pipe $l$ through the water contained in the pipe $m$ and thereby is gradually brought to a cold state and deposited in the storage-tank $n$, thoroughly freed from all impurities of a solid or volatile nature held in solution or suspension and also deprived from the usual excess of oxygen or common air, and which is necessary to improve the taste and render the water agreeable for drinking purposes and domestic use.

It will be seen that by this apparatus the operation of the double distillation is rendered inexpensive, the only fuel required being that to first raise the temperature of the water sufficiently to produce a sufficient amount of steam for condensation, so as to provide the requisite amount of water while a portion thereof passes away in vapor. It will be also noticed that while the first part of the process is carried on with the steam and condensation thereof free to the open atmosphere the latter part of the process is operated entirely within closed chambers and pipes, except where vent is provided through lint or other fibrous material, so that no absorption of dirt, dust or other deleterious matter can obtain, while the water of condensation passing from the condensing-chamber directly through pipes that are exposed to contact with surfaces that grow gradually cooler till thoroughly cold places the water in the most favorable condition for aerification and in condition to absorb the greatest amount of air which water is capable of retaining.

I am aware that it is not entirely necessary to redistill the water, as with the first distillation all vegetable and mineral ingredients are left behind and the uncondensed vapor; but as the condensing-chamber $n$ is open to the atmosphere to permit the escape of the volatile gases the second distillation within the closed chamber $b$ removes any deleterious matter that may remain in the water or be caught up within the chamber $n$, all foreign matters remaining in the evaporating portion of the chamber $b$, so that only pure water which is entirely deprived of its atmosphere is carried to the storage-tank ready for aeration.

Having described the construction and operation of my improvement, what I claim as new, and desire to secure by Letters Patent, is—

1. The combination with the steam boiler, of an evaporating vessel provided with a coil which receives the steam from the boiler and in which said steam is condensed, a tank open to the atmosphere which receives this distillate and from which the distillate is delivered into the evaporating vessel, and a condenser connected to said evaporating vessel, whereby the distillate of the first distillation is evaporated and again condensed.

2. The combination in a distilling apparatus, of the boiler, a condensing chamber having an opening to the atmosphere and a steam pipe leading from the boiler to the condensing chamber, and provided with a series of coils or bends, with a closed evaporating chamber, inclosing the said coils or bends of the steam pipe, and provided with a conical roof having its outer surface covered with a water space and provided at the base of the inner side of the roof with an annular drip trough, a pipe passing through the walls of the chamber and connected to the drip-trough, and a pipe for conducting water from the condensing chamber to the said evaporating chamber substantially as set forth.

3. In a water distilling apparatus, the combination with the boiler, a condensing chamber open to the atmosphere, a closed evaporating chamber having in its upper portion a condensing surface surrounded by a cold water chamber, a pipe for carrying off the water of condensation, a steam pipe leading from said boiler to the evaporating chamber and from there to the condensing chamber and coiled within the evaporating chamber and a pipe leading from the condensing chamber to the evaporating chamber for filling the latter, and provided with a valve, all substantially as set forth.

In testimony whereof I affix my signature in presence of two witnesses.

EDWARD C. HARGRAVE.

Witnesses:
  G. P. THOMAS,
  JAS. E. THOMAS.